UNITED STATES PATENT OFFICE.

H. L. SMITH, OF GAMBIER, ASSIGNOR TO WM. NEFF AND PETER NEFF, JR., OF CINCINNATI, OHIO.

PHOTOGRAPHIC PICTURES ON JAPANNED SURFACES.

Specification forming part of Letters Patent No. 14,300, dated February 19, 1856.

*To all whom it may concern:*

Be it known that I, HAMILTON L. SMITH, of Gambier, in the county of Knox and State of Ohio, have invented certain new and useful Improvements in Photographic Pictures; and I do hereby declare the following to be a full, clear, and exact description of the same, and of the manner of making and using my invention or discovery.

The nature of my invention or discovery relates to the taking of positive pictures by the photographic process upon a black japanned surface, prepared upon iron or any other metallic plates or sheets; and it consists in the use of collodion and a solution of salt of silver and an ordinary camera.

To enable others skilled in the art to make and use my invention, I will proceed to describe the manner of preparing and applying it which I have found to answer well in practice, not confining myself, however, to the special process or processes herein described, so long as the characteristics of the invention remain the same.

I first take metallic sheets, preferring for the purpose iron, as this metal is the only one, except the precious metals, which is without action on the silver salts generally used, as also the other chemicals; but other metallic or mineral sheets may be used; and I do not therefore confine myself specially to any particular metal. Upon each of the sheets is prepared a black japanned or varnished surface, such as is used by tinners or japanners for coating metallic and other surfaces. The japan or varnish may be made and applied as follows: Take one quart of raw linseed-oil. Add to this two ounces of asphaltum and sufficient umber or lamp-black to give the desired shade. Boil these ingredients until a portion dropped on a cool surface will remain in a round spot without flowing away. It is then thick enough to use. If it should be too thick, it can be readily thinned with spirits of turpentine. Apply the japan to the sheets or plates with a brush, and after allowing it to stand a short time, until the marks of the brush disappear, place the sheets or plates in a drying-oven, and submit them to heat until the surface will bear the finger to be drawn over it without bringing off the japan. It may, if found necessary, be coated again and treated in a similar way, and finally polished with rotten-stone and oil or other polishing material. Other ingredients may be used in making the japan—such as mastic, lac, or copal varnish—and other shades of coloring-matter may be used.

By "collodion" I mean any solution of guncotton or pyroxyline; and by a solution of "salt of silver" I mean any of the salts thereof which can be used in photography for obtaining positive impressions by a camera.

A japanned surface may be prepared on glass or on leather and other fibrous materials; or glass may be made black by means of coloring-matter introduced or embodied with the glass, so as to be in instead of on the glass; but foreseeing the difficulty of embracing all these preparations in one application, I do not desire to have them so considered, but reserve the right to hereafter apply for such application of my general principle as I may deem essential or of sufficient importance to be protected by Letters Patent; and it might be proper to add that vulcanized gutta-percha or indurated rubber may be used as the basis upon which or in which the japanned surface may be made. The invention, however, consists mainly on the surface, so that a silver picture may be made upon it, said surface forming the background of the picture.

The ingredients for fixing and developing the positive impression upon the japanned surface may be the same as those heretofore essayed by me on a former application, and need not again be repeated here, though other chemicals or other proportions of the same chemicals may be used.

Having thus fully described the nature of my improvement in photographic pictures, and shown how the same may be accomplished, what I claim therein as new, and desire to secure by Letters Patent, is—

The obtaining of positive impressions upon a japanned surface previously prepared upon an iron or other metallic or mineral sheet or plate by means of collodion and a solution of a salt of silver and a camera, substantially as herein described.

HAMILTON L. SMITH.

Witnesses:
GEO. I. CHAPMAN,
JAMES H. LEE.